United States Patent
Nagano et al.

(10) Patent No.: US 9,899,712 B2
(45) Date of Patent: Feb. 20, 2018

(54) BATTERY TEMPERATURE ADJUSTMENT UNIT AND VEHICLE HAVING SAID UNIT INSTALLED

(71) Applicant: Valeo Japan Co., Ltd., Kumagaya-shi (JP)

(72) Inventors: Hideki Nagano, Kumagaya (JP); Osamu Takahashi, Kumagaya (JP)

(73) Assignee: VALEO JAPAN CO., LTD., Kumagaya-Shi (JP)

(*) Notice: Subject to any disclaimer, the term of this patent is extended or adjusted under 35 U.S.C. 154(b) by 148 days.

(21) Appl. No.: 14/438,342

(22) PCT Filed: Oct. 22, 2013

(86) PCT No.: PCT/JP2013/078526
§ 371 (c)(1),
(2) Date: Apr. 24, 2015

(87) PCT Pub. No.: WO2014/065255
PCT Pub. Date: May 1, 2014

(65) Prior Publication Data
US 2015/0280292 A1    Oct. 1, 2015

(30) Foreign Application Priority Data

Oct. 24, 2012  (JP) .................................. 2012-235035
May 31, 2013  (JP) .................................. 2013-115447

(51) Int. Cl.
*B60H 1/00*    (2006.01)
*H01M 10/625*  (2014.01)
(Continued)

(52) U.S. Cl.
CPC .............. *H01M 10/625* (2015.04); *B60K 1/04* (2013.01); *B60L 1/003* (2013.01); *B60L 1/02* (2013.01);
(Continued)

(58) Field of Classification Search
CPC .............. B60L 11/1888; B60L 11/1892; B60L 11/1894; B60L 11/1874; B60L 11/1875;
(Continued)

(56) References Cited

U.S. PATENT DOCUMENTS

| | | | | |
|---|---|---|---|---|
| 7,061,208 B2* | 6/2006 | Nishihata | ........... | G05D 23/1919 320/150 |
| 7,230,404 B2* | 6/2007 | Kimoto | ............... | H01M 2/1077 320/150 |

(Continued)

FOREIGN PATENT DOCUMENTS

| FR | 2829619 A1 * | 3/2003 | .......... H01M 10/625 |
|---|---|---|---|
| JP | H 02-102815 A | 4/1990 | |

(Continued)

OTHER PUBLICATIONS

FR 2829619 A1 translation.*
(Continued)

*Primary Examiner* — Len Tran
*Assistant Examiner* — Jon T Schermerhorn
(74) *Attorney, Agent, or Firm* — Howard & Howard Attorneys PLLC

(57) ABSTRACT

To provide a battery temperature adjustment unit capable of efficiently supplying air adjusted to an appropriate temperature to a battery. A unit provided in a module case accommodating a battery includes a unit case having an air inlet and an air outlet, a heat exchanger disposed in the unit case, and a blower disposed in the unit case, in which air in the module case is sucked through the air inlet by the blower while being blown out through the air outlet and circulates through the module case and the air blown out through the air outlet includes air that has passed through the heat exchanger and air that has not passed through the heat exchanger. The unit also includes a heater disposed in (Continued)

parallel with a heat exchanger for cooling or disposed closer to the air inlet than the heat exchanger for cooling.

10 Claims, 11 Drawing Sheets

(51) Int. Cl.
| | |
|---|---|
| *H01M 10/613* | (2014.01) |
| *H01M 10/6563* | (2014.01) |
| *H01M 10/6565* | (2014.01) |
| *H01M 10/657* | (2014.01) |
| *H01M 10/6571* | (2014.01) |
| *B60K 1/04* | (2006.01) |
| *B60L 1/00* | (2006.01) |
| *B60L 1/02* | (2006.01) |
| *B60L 3/00* | (2006.01) |
| *B60L 11/18* | (2006.01) |
| *B60K 11/04* | (2006.01) |
| *B60K 11/06* | (2006.01) |
| *B60K 1/00* | (2006.01) |

(52) U.S. Cl.
CPC ......... *B60L 3/0046* (2013.01); *B60L 11/1874* (2013.01); *B60L 11/1875* (2013.01); *B60L 11/1879* (2013.01); *H01M 10/613* (2015.04); *H01M 10/657* (2015.04); *H01M 10/6563* (2015.04); *H01M 10/6565* (2015.04); *H01M 10/6571* (2015.04); *B60K 11/04* (2013.01); *B60K 11/06* (2013.01); *B60K 2001/005* (2013.01); *B60K 2001/008* (2013.01); *B60L 2240/545* (2013.01); *H01M 2220/20* (2013.01); *Y02T 10/7005* (2013.01); *Y02T 10/705* (2013.01)

(58) Field of Classification Search
CPC ............. H01M 10/625; H01M 10/663; H01M 10/6572
See application file for complete search history.

(56) References Cited

U.S. PATENT DOCUMENTS

| | | | | |
|---|---|---|---|---|
| 9,564,667 | B2 * | 2/2017 | Iwasa | H01M 10/625 |
| 9,566,859 | B2 * | 2/2017 | Hatta | B60K 11/06 |
| 2009/0071178 | A1 * | 3/2009 | Major | B60H 1/00278 |
| | | | | 62/239 |
| 2014/0072835 | A1 * | 3/2014 | Tsujimura | H01M 2/1072 |
| | | | | 429/7 |
| 2015/0079433 | A1 * | 3/2015 | Tamai | H01M 10/48 |
| | | | | 429/62 |

FOREIGN PATENT DOCUMENTS

| | | | |
|---|---|---|---|
| JP | 2002-313441 | A | 10/2002 |
| JP | 2002313441 | A * | 10/2002 |
| JP | 2004-288527 | A | 10/2004 |
| JP | 2006-143183 | A | 6/2006 |
| JP | 2007-027039 | A | 2/2007 |
| JP | 2007-185997 | A | 7/2007 |
| WO | WO 2008/018374 | A1 | 2/2008 |

OTHER PUBLICATIONS

International Search Report for Application No. PCT/JP2013/078526 dated Jan. 21, 2014, 5 pages.
English language abstract for JPH 02-102815 extracted from espacenet.com database on Apr. 30, 2015, 2 pages.
English language abstract and machine-assisted English translation for JP 2002-313441 extracted from espacenet.com database on Apr. 30, 2015, 17 pages.
English language abstract for JP 2004-288527 extracted from espacenet.com database on Apr. 30, 2015, 2 pages.
English language abstract and machine-assisted English translation for JP 2006-143183 extracted from espacenet.com database on Apr. 30, 2015, 53 pages.
English language abstract and machine-assisted English translation for JP 2007-027039 extracted from espacenet.com database on Apr. 30, 2015, 12 pages.
English language abstract and machine-assisted English translation for JP 2007-185997 extracted from espacenet.com database on Apr. 30, 2015, 40 pages.
English language abstract for WO 2008/018374 extracted from espacenet.com database on Apr. 30, 2015, 1 page.

* cited by examiner

BATTERY TEMPERATURE ADJUSTMENT UNIT AND VEHICLE HAVING SAID UNIT INSTALLED

RELATED APPLICATIONS

This application is the National Stage of International Patent Application No. PCT/JP2013/078526, filed on Oct. 22, 2013, which claims priority to and all the advantages of Japanese Patent Application No. JP 2013-115447, filed on May 31, 2013, and Japanese Patent Application No. JP 2012-235035, filed Oct. 24, 2012, the contents of which are incorporated herein by reference.

TECHNICAL FIELD

The present invention relates to a battery temperature adjustment unit configured to perform the temperature adjustment and circulation of air in a module case accommodating a battery.

BACKGROUND ART

An electric car or hybrid car includes a battery that stores electric power for driving the vehicle. There is a known structure of a battery module in which a battery is cooled using a refrigeration cycle for interior air conditioning. For example, in the battery modules disclosed in PTL 1 and PTL 2, air cooled by passing through the heat exchanger of the refrigeration cycle is transmitted to the battery using a blower. In addition, in the battery module disclosed in PTL 3, a battery is disposed in a module case and a heat exchanger through which the cooling medium of the refrigeration cycle passes is provided in a module case. In particular, FIGS. 12 and 14 in PTL 3 disclose the structure in which air in the module case cooled by the heat exchanger is supplied to the battery.

As described in the above related art, there are two known structures (A) and (B) for cooling a battery using cooled air. In the structure (A), air sucked from the outside is cooled, transferred to the battery, and exhausted to the outside. In the structure (B), air in the module case accommodating the battery is cooled and circulated. When air sucked from the outside is used as in the structure (A), dust or water may also be sucked. Since a battery is a delicate electronic part, the structure (A) is not appropriate. In contrast, since the structure (B) circulates air in the module case accommodating the battery, there is not possibility of sucking dust or water. That is, when the heat exchanger for cooling air is disposed in the battery case to cool the battery as in the structure (B), there is an advantage of being able to separate the battery from dust or water coming from the outside.

CITATION LIST

Patent Literature

PTL 1: JP-A-2006-143183
PTL 2: JP-A-2007-185997
PTL 3: WO 2008/018374

SUMMARY OF INVENTION

Technical Problem

To cool a battery evenly, a large amount of air is desirably supplied to the battery. A battery for storing electric power for operating an electric vehicle or hybrid car includes many unit cells called battery cells and the battery has a complicated surface shape because the unit cells are disposed, for example, at regular intervals. A sufficient amount of air needs to be supplied to such a battery to eliminate an insufficiently-cooled section due to the retention of air on its surface.

Accordingly, it is preferable to dispose a battery temperature adjustment unit including a heat exchanger and a blower in the module case accommodating the battery and to circulate a large amount of air in the module case using this unit for cooling. However, in a structure in which all of the air moved by the blower passes through the heat exchanger, air may not be circulated satisfactorily due to the air-flow resistance of the heat exchanger. In addition, when the capability of the blower is improved to promote the circulation of air, the cost of the blower becomes high.

A battery may be heated to appropriately exploit its capability. The heat exchanger to be used includes a heat exchanger for cooling that cools a battery by cooling air, a heat exchanger for heating that heats a battery by heating air, or a general-purpose heat exchanger that performs switching between cooling and heating depending on the temperature of the circulating medium. The air-flow resistance problem of a heat exchanger is present in either of the heat exchangers.

The inventors of the application have devised the inventions of the application by repeating the design and verification to obtain a better battery temperature adjustment unit by considering the relationship between the capability of a heat exchanger required to adjust the temperature of the battery of a present electric car or hybrid car and the amount of air supplied to the battery in the technical field of a battery module that adopts the structure (B).

The invention addresses the above problem with an object of providing a battery temperature adjustment unit capable of efficiently supplying air adjusted to an appropriate temperature to a battery, a battery module including the battery temperature adjustment unit to be mounted in a vehicle, and the vehicle.

In a battery temperature adjustment unit of this type, it is strongly desired to efficiently supply air adjusted to an appropriate temperature to a battery and to reduce the size of the unit.

The invention provides a battery temperature adjustment unit having a rational and small-sized structure while maintaining a configuration capable of efficiently supplying air adjusted to an appropriate temperature to a battery, a battery module including the battery temperature adjustment unit to be mounted in a vehicle, and the vehicle.

Solution to Problem

The invention described in claim 1 of the application is, when indicated by reference numbers used in embodiments, a battery temperature adjustment unit (100) provided in a module case (10) accommodating a battery (2), including a unit case (110) having an air inlet (111) and an air outlet (112), a heat exchanger (120) disposed in the unit case (110), and a blower (130) disposed in the unit case (110), in which air in the module case (10) is sucked through the air inlet (111) by the blower (130) while being blown out through the air outlet (112) and circulates through the module case (10) and the air blown out through the air outlet (112) includes air that has passed through the heat exchanger (120) and air that has not passed through the heat exchanger (120).

The invention described in claim 2 of the application is the battery temperature adjustment unit (100) according to claim 1, in which the heat exchanger (120) is disposed closer to the air inlet (111) than the blower (130) and the unit case (110) has a second inlet (113) in a section between the heat exchanger (120) and the blower (130).

The invention described in claim 3 of the application is the battery temperature adjustment unit (100) according to claim 1 or 2, in which the unit case (110) has a bypass passage (114) through which part of the air sucked through the air inlet (111) passes by bypassing the heat exchanger (120).

The invention described in claim 4 of the application is the battery temperature adjustment unit (100) according to any one of claims 1 to 3, in which the unit case (110) includes an electric heater (140).

The invention described in claim 5 of the application is an in-vehicle battery module (1) including the battery temperature adjustment unit (100) according to any one of claims 1 to 4.

The invention described in claim 6 of the application is a vehicle including the battery temperature adjustment unit (100) according to any one of claims 1 to 4.

The invention described in claim 7 of the application is a battery temperature adjustment unit (100) provided in a module case (10) accommodating a battery (2), including a unit case (110) having an air inlet (111) and an air outlet (112), a heat exchanger (120) disposed in the unit case (110), a blower (130) disposed in the unit case (110), in which air in the module case (10) is sucked through the air inlet (111) by the blower (130) while being blown out through the air outlet (112) and circulates through the module case (10) and the heat exchanger (120) is a heat exchanger for cooling and disposed between the air inlet (111) and the blower (130), and a heater (140) disposed between the air inlet (111) and the blower (130), in which the heater (140) is disposed in parallel with the heat exchanger for cooling (120) or disposed closer to the air inlet (111) than the heat exchanger for cooling.

The invention described in claim 8 of the application is the battery temperature adjustment unit (100) according to claim 7, in which the heater (140) is disposed between the air inlet (111) and the heat exchanger for cooling (120).

The invention described in claim 9 of the application is the battery temperature adjustment unit (100) according to claim 7, in which the heater (140) is disposed in parallel with the heat exchanger for cooling (120).

The invention described in claim 10 of the application is the battery temperature adjustment unit (100) according to any one of claims 7 to 9, in which the heater (140) is an electrically heat-generating heater.

The invention described in claim 11 of the application is an in-vehicle battery module (1) including the battery temperature adjustment unit (100) according to any one of claims 7 to 9.

The invention described in claim 12 of the application is a vehicle including the battery temperature adjustment unit (100) according to any one of claims 7 to 9.

The invention described in claim 13 of the application is the vehicle according to claim 12, in which the heater (140) is disposed above the heat exchanger for cooling (120).

According to a first invention (claims 1 to 6) of the present application, there is provided a battery temperature adjustment unit capable of efficiently supplying air adjusted to an appropriate temperature to a battery. The concept of the first invention of the present application will be described below.

The battery temperature adjustment unit includes a heat exchanger and a blower disposed in a unit case. Air in the module case is circulated by the blower and the temperature is adjusted by the heat exchanger.

In terms of the efficiency with which the air temperature is adjusted by the heat exchanger, all of the air blown out through the air outlet of the unit case preferably passes through the heat exchanger. However, if the heat exchanger has a small size and high performance, the area in contact with the air becomes small, thereby increasing the air-flow resistance of the heat exchanger. As a result, the amount of air blown out through the air outlet of the unit case reduces and a large amount of air cannot be supplied. In other words, the flow rate of air circulating through the module case cannot be increased. If the area in contact with the air is increased to reduce the air-flow resistance, the heat exchanger becomes large, thereby increasing the size of the battery temperature adjustment unit.

Consequently, it is preferable to adjust the amount of air blown out through the air outlet of the unit case by using a heat exchanger with a small size and high performance and devising the structure of the unit case to get the most of the performance of the blower.

The first invention of the application is achieved by making a contraption to the structure of the unit case so that air blown out through the air outlet includes air that has passed through the heat exchanger and air that has not passed through the heat exchanger. In this structure, it is possible to ensure the balance between the adjustment of air temperature by the heat exchanger and the adjustment of battery temperature by air in consideration of the performance of the blower.

As described above, since a contraption is made so that air blown out through the air outlet includes air that has not passed through the heat exchanger, air in the module case can be circulated rationally. As a result, the efficiency of the temperature adjustment of the battery is improved reliably. The excellent effectiveness of the inventive structure has been confirmed by trial manufacture carried out by the inventors of the application.

According to a second invention (claims 7 to 13) of the present application, as in the first invention of the application, there is provided a battery temperature adjustment unit capable of efficiently supplying air adjusted to an appropriate temperature to a battery and rationally reducing its size. The concept of the second invention of the present application will be described below.

To reduce the size of the battery temperature adjustment unit, it is preferable to dispose the air inlet, the heat exchanger, and the blower in this order. That is, the heat exchanger is preferably disposed upstream of the blower. This is because, by disposing the heat exchanger upstream of the air inlet even when the ventilation area of the heat exchanger is larger than the area of the air inlet of the blower, air flows through the heat exchanger at an even flow rate, thereby preventing reduction in the amount of heat exchanged between air and the heat exchanger. Most of all, even when the heat exchanger is disposed close to the air inlet, the effect of evenly flowing air through the heat exchanger can be obtained.

Since general in-vehicle air conditioners have an object of achieving the comfort of vehicle occupants, a dehumidification function is important in addition to heating and cooling functions. Therefore, air circulating through the air conditioner is first dehumidified by the evaporator and, if necessary, heated by passing it through the heater core. Accordingly, in general air conditioners used by vehicles such as automobiles, the evaporator (heat exchanger for cooling) and the heater core (heat exchanger for heating) are disposed in this order from the upstream side to downstream side.

In such in-vehicle air conditioners, the evaporator is not generally disposed downstream of the heater core. That is, if air heated by the heater core is cooled by the evaporator on the downstream side, the energy efficiency is significantly degraded and this method is not used.

An evaporator used in a general in-vehicle air conditioner needs to have the function of reliably dehumidifying air circulating though the air conditioner, so the evaporator is disposed in the duct to prevent the air from bypassing the evaporator.

It has been found that a defect occurs in the heater core on the downstream side when size reduction is attempted by applying the above in-vehicle air conditioner (that is, the air conditioner having the evaporator (heat exchanger for cooling) on the upstream side and the heater core (heat exchanger for heating) on the downstream side) to the battery temperature adjustment unit.

In this case, if air is cooled on the upstream side by the evaporator, the air condenses to water. Then, the water is conveyed by circulating air, reaches the heater core on the downstream side when the evaporator is close to the heater core because of size reduction, and adheres to the heater core.

The heater core to which water droplets have adhered gradually degrades and causes a defect of the heater core (such as corrosion of the aluminum core) over time. If the distance between the evaporator and the heater core is increased to prevent this defect (that is, to prevent water droplets from adhering to the heater core) from occurring, the size of the entire apparatus cannot be reduced.

Since it is difficult to apply an in-vehicle air conditioner for achieving the comfort of vehicle occupants to a battery temperature adjustment unit as described above, its solution has been considered.

On the other hand, the following things can be considered in terms of the air conditioning of a battery. That is, since a battery generates heat during charging or discharging, the battery basically needs to be cooled. In contrast, in a cold district, a battery needs to be separately heated secondarily in terms of the operation efficiency and charging efficiency (for example, the temperature is raised from −40° C. to −10° C. or so in a cold district).

As a result of considering the characteristics of a battery and the air conditioning types of a battery temperature adjustment unit as described above, it has been found that there is no need to dehumidify air by operating a heat exchanger for cooling and a heat exchanger for heating at the same time. Accordingly, even when both a heat exchanger for cooling and a heat exchanger for heating are disposed, unlike a general in-vehicle air conditioner, there are no functional problems even if the positions of these heat exchangers are exchanged as compared with those in an in-vehicle air conditioner.

In addition, as a result of considering the air conditioning types of a battery temperature adjustment unit, it has also been found that the function of reliably dehumidifying air circulating through the apparatus is not needed. Accordingly, it has been found that, even when the heat exchanger for cooling is disposed in the battery temperature adjustment unit, there is no problem even when circulating air bypasses the heat exchanger for cooling as long as the required cooling capability is ensured.

Accordingly, in the battery temperature adjustment unit, the defect that may be caused in the case of the above in-vehicle air conditioner can be prevented by disposing the heater core on the upstream side and the evaporator on the downstream side (serial disposition form) and disposing the heater core in parallel with the evaporator (parallel disposition form). The distance between the heater core and the evaporator can be reduced by adopting the form in which the heater core is disposed on the upstream side and the evaporator is disposed on the downstream side or the parallel disposition form as described above. The second invention of the application has been devised based on the above finding.

The second invention of the application is a battery temperature adjustment unit in which a heat exchanger basically used is a heat exchanger for cooling, disposed between an air inlet and a blower, and has a heater between the air inlet and the blower, and the heater is disposed in parallel with the heat exchanger for cooling or disposed closer to the air inlet than the heat exchanger for cooling.

Since the blower is disposed close to the air outlet in such a structure, air can be efficiently blown to the battery as in the first invention of the application, thereby enabling the rational circulation of air in the module case. As a result, the efficiency of the temperature adjustment of the battery is improved reliably.

In addition, since the heater is disposed in parallel with the heat exchanger for cooling or disposed closer to the air inlet than the heat exchanger for cooling, it is possible to prevent the situation in which water generated through condensation by the evaporator reaches and adheres to the heater core on the downstream side, which occurs in a general in-vehicle air conditioner, and to reduce the distance between the heater core and the evaporator, thereby achieving the size reduction of the apparatus.

Advantageous Effects of Invention

According to the present invention, there is provided a battery temperature adjustment unit capable of efficiently supplying air adjusted to an appropriate temperature to a battery.

DESCRIPTION OF EMBODIMENTS

Figure 2:
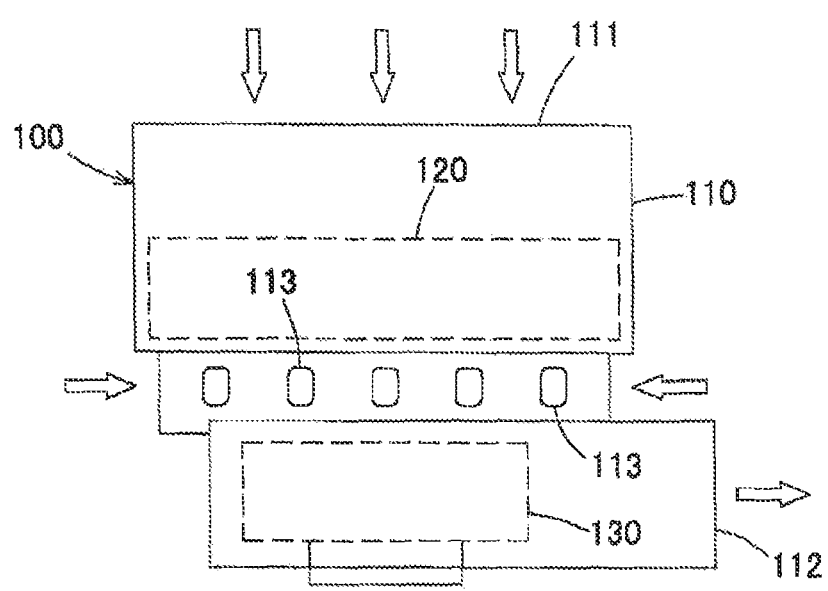
FIG. 2 illustrates a side of a battery temperature adjustment unit according to the first embodiment of the invention.
Figure 3:
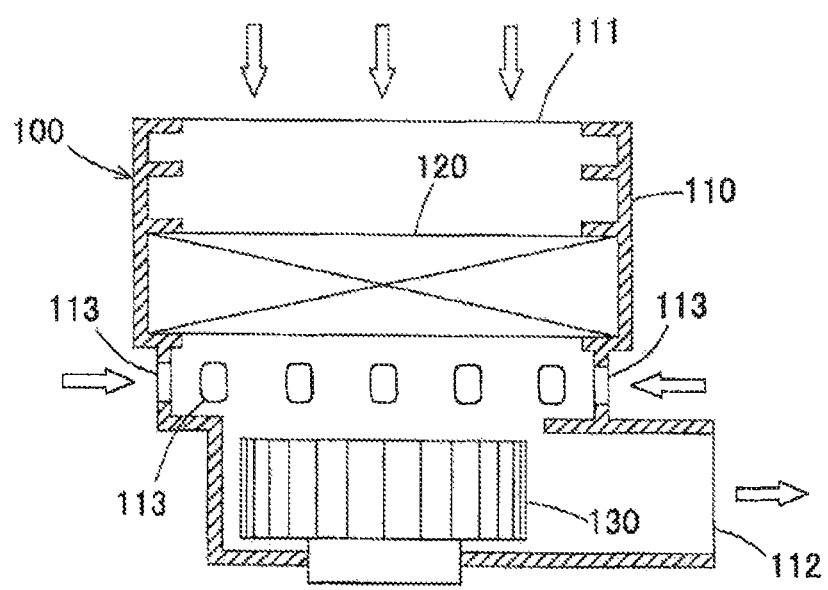
FIG. 3 illustrates the cross section of the side of the battery temperature adjustment unit according to the first embodiment of the invention.

Embodiments of the present invention will be described with reference to the drawings. A battery module 1 shown in FIG. 1 cools a battery 2 of an electric car or hybrid car. This battery module 1 includes a module case 10 accommodating the battery 2 and a battery temperature adjustment unit 100 provided in the module case 10. As shown in FIGS. 2 and 3, the battery temperature adjustment unit 100 includes a heat exchanger 120 and a blower 130 disposed in a unit case 110 and the battery temperature adjustment unit 100 is secured to the interior of the module case 10 by, for example, a method such as screwing. The unit case 110 is a member with a duct structure and includes an air inlet 111 and an air outlet 112. Air in the module case 10 sucked through the air inlet 111 of the unit case 110 by the blower 130 is cooled by passing through the heat exchanger 120 and is blown out through the air outlet 112 of the unit case 110. Then, the air blown out through the air outlet 112 of the unit case 110 cools the battery 2 and is sucked through the air inlet 111 again. As described above, the air in the module case 10 is sucked through the air inlet 111 while being blown out through the air outlet 112 by the blower 130 and circulates through the module case 10.

In the battery 2, a plurality of battery cells are supported by a predetermined supporting member. Air in the module case 10 cools the battery cells by passing on the surfaces of the battery cells or passing through the space between the battery cells.

Although the specific structure of the module case 10 is not limited to a particular example. However, in this embodiment, the module case 10 is configured by assembling a first module case member 11 of upper opening type, a second module case member 12, which functions as its lid, and a third module case member 13, which is an intermediate plate. The battery module 1 is configured by placing the battery temperature adjustment unit 100 on the first module case member 11, assembling the third module case member 13 to the first module case member 11, placing a battery 2 on the third module case member 13, and assembling the second module case member 12 to the first module case member 11. A first communication hole 13a to be connected to the air outlet 112 of the unit case 110, and a second communication hole 13b, which guides air from the battery 2 to the battery temperature adjustment unit 100, are provided in necessary portions of the third module case member 13.

In the unit case 110 in this embodiment, the heat exchanger 120 is disposed close to the air inlet 111 and the blower 130 is disposed close to the air outlet 112. That is, the heat exchanger 120 is disposed closer to the air inlet 111 than the blower 130. By disposing the heat exchanger 120 upstream of the blower 130 as described above, reduction in the static pressure uniformly acts on the heat exchanger 120 when the blower 130 sucks air, and the air evenly passes through the heat exchanger 120. This can suppress an increase in the air-flow resistance. A second inlets 113 are provided in a section between the heat exchanger 120 and the blower 130. Air sucked through the second inlet 113 is blown out through the air outlet 112 without passing through the heat exchanger 120.

The blower 130 includes a fan with a predetermined shape and a motor for driving the fan. A sirocco fan, which is an multi-blade air blower suited to a relatively-low static pressure range, is adopted as this fan.

A part of the cooling medium of a refrigeration cycle for performing interior air conditioning circulates through the heat exchanger 120. The refrigeration cycle includes a compressor compressing the cooling medium, a condenser condensing the cooling medium by radiating the heat of the compressed cooling medium to the outside air, an expansion apparatus adiabatically expanding the condensed cooling medium, and an air conditioning evaporator exchanging heat between the adiabatically expanded cooling medium and the inside air. The cooling medium flows through the compressor, the condenser, the expansion apparatus, the air conditioning evaporator, and the compressor in this order. The refrigeration cycle further includes a cooling medium branching unit flowing a part of the cooling medium flowing from the expansion apparatus to the air conditioning evaporator into the heat exchanger 120 and a control valve controlling whether the cooling medium is transferred to the heat exchanger 120. By driving the control valve as necessary, a part of the cooling medium flowing through the air conditioning evaporator circulates through the heat exchanger 120 by bypassing the air conditioning evaporator and returns to the compressor.

The heat exchanger 120 includes a plurality of tubes disposed in parallel with each other, a plurality of corrugated fins provided between the plurality of tubes, a pair of headers to which each of the ends of the plurality of tubes is connected, an inlet piping joint provided on the pair of headers, and an outlet piping joint provided on the pair of headers. A pipe 121 through which the cooling medium of the refrigeration cycle circulates is connected to each of the piping joints (not shown). The air in the module case 10 is cooled by the cooling medium circulating through the heat exchanger 120 via the plurality of tubes and the plurality of corrugated fins.

The module case 10 preferably has good heat insulation and hermeticity. The module case members 11, 12, and 13 may be assembled via seal members. Hermetic means such as grommets are preferably provided for holes through which the pipe 121 passes and holes through which electric wires of the battery 2 and the blower 130 pass. In addition, air vents for adjusting the internal pressure of the module case 10 depending on changes in the atmospheric pressure may be provided in necessary portions of the module case 10. In this case, filters for preventing intrusion by dust are preferably provided in the air vents.

The unit case 110 in this embodiment is configured so that air blown out through the air outlet 112 includes air that has not passed through the heat exchanger 120 by sucking air through the second inlet 113, as described above.

In such a structure, cooling of air by the heat exchanger 120 and cooling of the battery 2 by air blown out through the air outlet 112 can be ensured in good balance, thereby improving the cooling efficiency of the battery 2 reliably.

The number of the second inlets 113 and the shape, size, position, and so on of the second inlet 113 are set as appropriate in consideration of the cooling efficiency of the battery 2. In the unit case 110 illustrated in the drawing, the second inlets 113 of a circular or substantially circular shape are provided at predetermined intervals in a section between the heat exchanger 120 and the blower 130.

The inventors of the application checked, by experiment, the ratio (ratio of the amount of air sucked through the second inlet 113) of the amount of air that has not passed through the heat exchanger 120 to the amount of air blown out through the air outlet 112. If the amount of air blown out through the air outlet 112 is assumed to be 100 to 200 [m³/h], the actual range of the ratio was from 10 to 50 [%], more preferably from 15 to 30 [%].

When the ratio of the amount of air that has not passed through the heat exchanger 120 falls below this range, it is difficult to satisfactorily keep the amount of air to be supplied to the battery 2 due to the air-flow resistance of the heat exchanger 120. If the performance of the blower 130 is improved to satisfactorily keep the amount of air to be supplied to the battery 2, the amount of air passing through the heat exchanger 120 increases unnecessarily and the cost of the blower 130 increases. When the ratio of the amount of air that has not passed through the heat exchanger 120 falls beyond this range, the amount of air passing through the heat exchanger 120 reduces and the cooling of air by the heat exchanger 120 becomes insufficient. In contrast, the battery temperature adjustment unit 100 in this embodiment determines the ratio of the amount of air that has not passed through the heat exchanger 120 to the amount of air blown out through the air outlet 112 to be a preferable value based on verification, as desirable design conditions during the cooling of the battery 2 of an electric car or hybrid car. That is, the structure is designed very rationally to make the most of the performance of the heat exchanger 120 and the blower 130 to be used.

As described above, in the battery temperature adjustment unit 100 in this embodiment, air that has passed through the heat exchanger 120 and air that has not passed through the heat exchanger 120 are blown out through the air outlet 112, so that air cooled to an appropriate temperature can be supplied to the battery 2 in good balance. The structures of components in this embodiment may be modified as appropriate within the technical scope designated in the appended claims and the structures are not limited to the illustration in the drawings.

Figure 4:
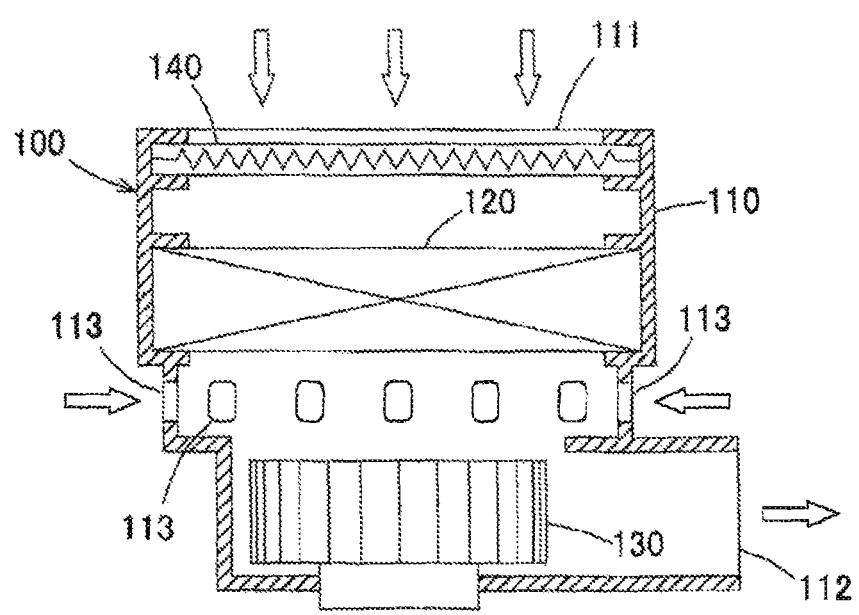
FIG. 4 illustrates the cross section of the side of the battery temperature adjustment unit (with a heater attached) according to the first embodiment of the invention.

For example, as shown in FIG. 4, an electric heater 140 may be provided in the unit case 110 so as to heat the internal air of the module case 10 and then heat the battery 2 via the air. The battery 2 may need to be heated in a cold district to obtain the stable discharge and charge capability of the battery 2. If the electric heater 140 is detachably provided in the unit case 110, the versatility of the battery temperature adjustment unit 100 can be improved.

Although the heat exchanger 120 described above uses a part of the cooling medium of the refrigeration cycle that performs interior air conditioning, a refrigeration cycle for cooling the battery may be provided separately from the interior air conditioning and the cooling medium of the refrigeration cycle may be used.

Although a heat exchanger for cooling that cools the battery by cooling air is adopted as the heat exchanger 120 in the embodiment, a heat exchanger for heating that heats the battery by heating air or a general-purpose heat exchanger that performs switching between cooling and heating depending on the temperature of a circulating medium may be adopted.

Figure 5:
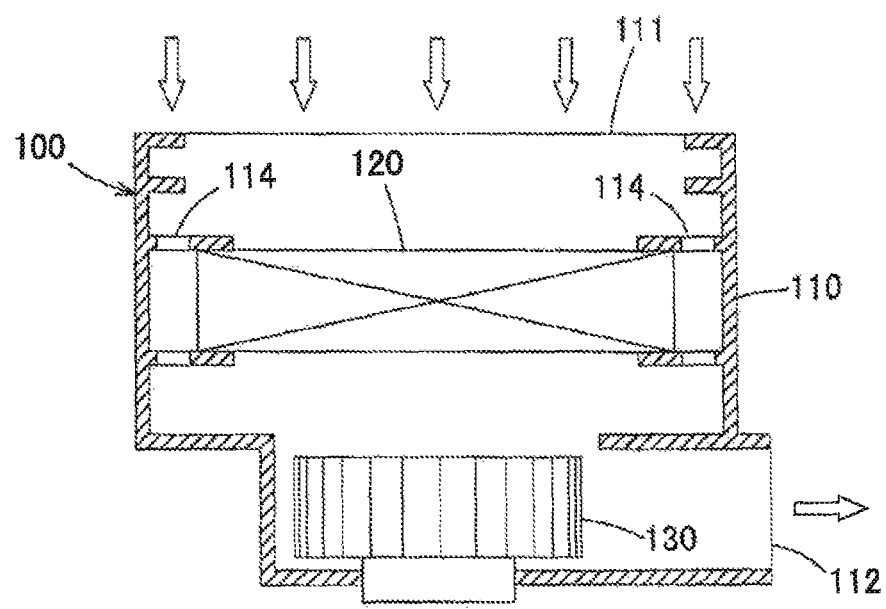
FIG. 5 illustrates the cross section of a side of a battery temperature adjustment unit according to a second embodiment of the invention.

Next, a second embodiment of the invention will be described with reference to FIG. 5. In the unit case 110 according to the embodiment, the heat exchanger 120 is disposed close to the air inlet 111 and the blower 130 is disposed close to the air outlet 112 and part of air sucked through the air inlet 111 passes through the side sections of the heat exchanger 120. Bypass passages 114 are provided in the side sections of the heat exchanger 120 and part of air sucked through the air inlet 111 passes through the bypass passages 114 by bypassing the heat exchanger 120.

As described above, by disposing the bypass passages 114 through which part of air sucked through the air inlet 111 passes by bypassing the heat exchanger 120, air blown out through the air outlet 112 may include air that has not passed through the heat exchanger 120. The second inlet 113 described in the first embodiment may be disposed as appropriate in the unit case 110 in this embodiment. The flexibility of design of the unit case 110 can be improved by combining the bypass passage 114 with the second inlet 113.

Figure 6:
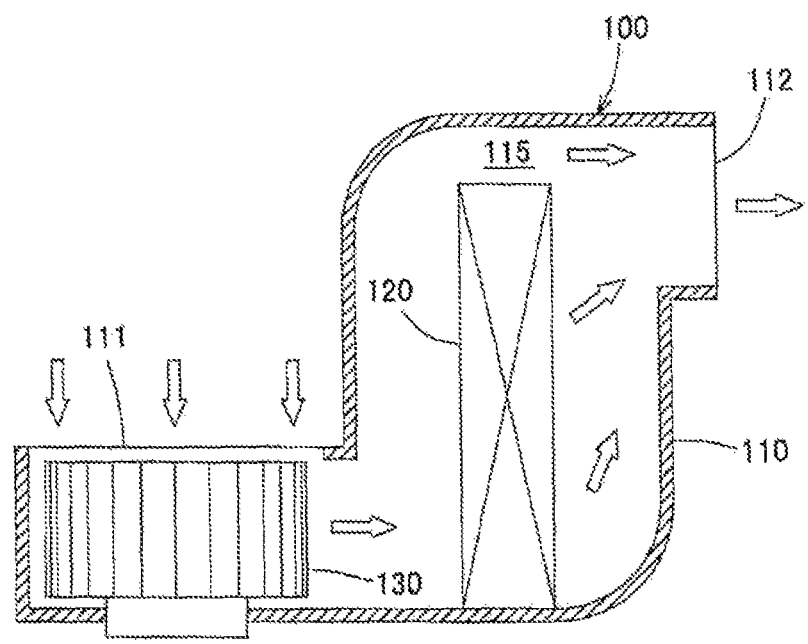
FIG. 6 illustrates the cross section of a side of a battery temperature adjustment unit according to a third embodiment of the invention.

Next, a third embodiment of the invention will be described with reference to FIG. 6. In the unit case 110 according to the embodiment, the blower 130 is disposed close to the air inlet 111 and the heat exchanger 120 is disposed close to the air outlet 112 and part of air directed from the blower 130 to the air outlet 112 passes through the side section of the heat exchanger 120. A bypass passage 115 is provided between the side section of the heat exchanger 120 and the unit case 110 and part of air passes through the bypass passage 115.

As described above, in the unit case 110 in which the blower 130 is disposed close to the air inlet 111 and the heat exchanger 120 is disposed close to the air outlet 112, air blown out through the air outlet 112 preferably includes air that has not passed through the heat exchanger 120 by providing the bypass passage 115 between the heat exchanger 120 and the unit case 110.

Next, a fourth embodiment of the invention will be described with reference to FIG. 7. In this embodiment, the battery module 1 is basically the same as the battery module 1 shown in FIG. 1, and the same components are given the same reference numbers to omit the detailed description.

Figure 7:
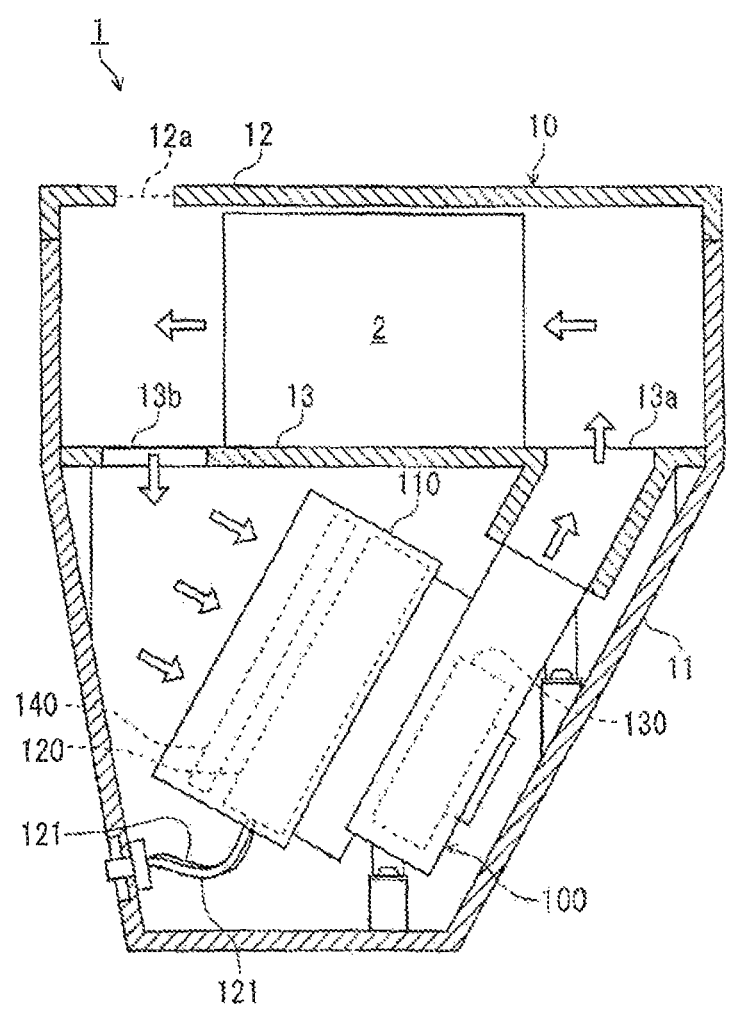
FIG. 7 illustrates a battery module according to a fourth embodiment of the invention.

In the battery temperature adjustment unit 100 of the battery module 1 shown in FIG. 7, the heater 140 is provided in the unit case 110 as in the battery temperature adjustment unit 100 in FIG. 4 so as to heat the air in the module case 10 and then heat the battery 2 via the air. In the embodiment, an electrically heat-generating heater (also referred to below as simply an electric heater) is used as the heater 140.

More specifically, the battery temperature adjustment unit 100 is provided in the module case 10 accommodating the battery 2 and includes the unit case 110 having an air inlet and an air outlet, the heat exchanger 120 disposed in the unit case 110, and the blower 130 disposed in the unit case 110. The air in the module case 10 is sucked through the air inlet while being blown out through the air outlet by the blower 130 and circulates through the module case 10.

The heat exchanger 120 is a heat exchanger for cooling disposed upstream of the blower 130 (between the air inlet and the blower) and includes the electric heater (heater) 140 upstream of the heat exchanger 120.

When the electric heater 140 is provided upstream of the heat exchanger 120, if water droplets are generated during cooling by the heat exchanger 120 and conveyed by circulating air, the water droplets do not reach the electric heater 140 on the upstream side and the above detects (such as corrosion of the heater) can be prevented. As a result, the electric heater 140 can be disposed as close as possible to the heat exchanger 120, thereby achieving size reduction of the apparatus.

Since the blower 130 is disposed downstream of the electric heater 140 and the heat exchanger 120 and sucks the circulating air, even if the electric heater 140 and the heat exchanger 120 are close to the blower 130, circulating air passes through the electric heater 140 and the heat exchanger 120 evenly, thereby enabling efficient heat exchange. In addition, even if the air circulation area of the electric heater 140 is different from that of the heat exchanger 120, the circulating air passes through both circulating surfaces (heat exchange surfaces) evenly, thereby enabling efficient heat exchange.

In FIG. 7, a film body 12a through which air can circulate is provided in the module case member 12. When the module case 10 forms a closed circuit as in this example, disposition of the film body 12a prevents pressure loss of the module case 10 due to the atmospheric pressure caused by differences in the altitude of a place where the invention is used.

Figure 1:
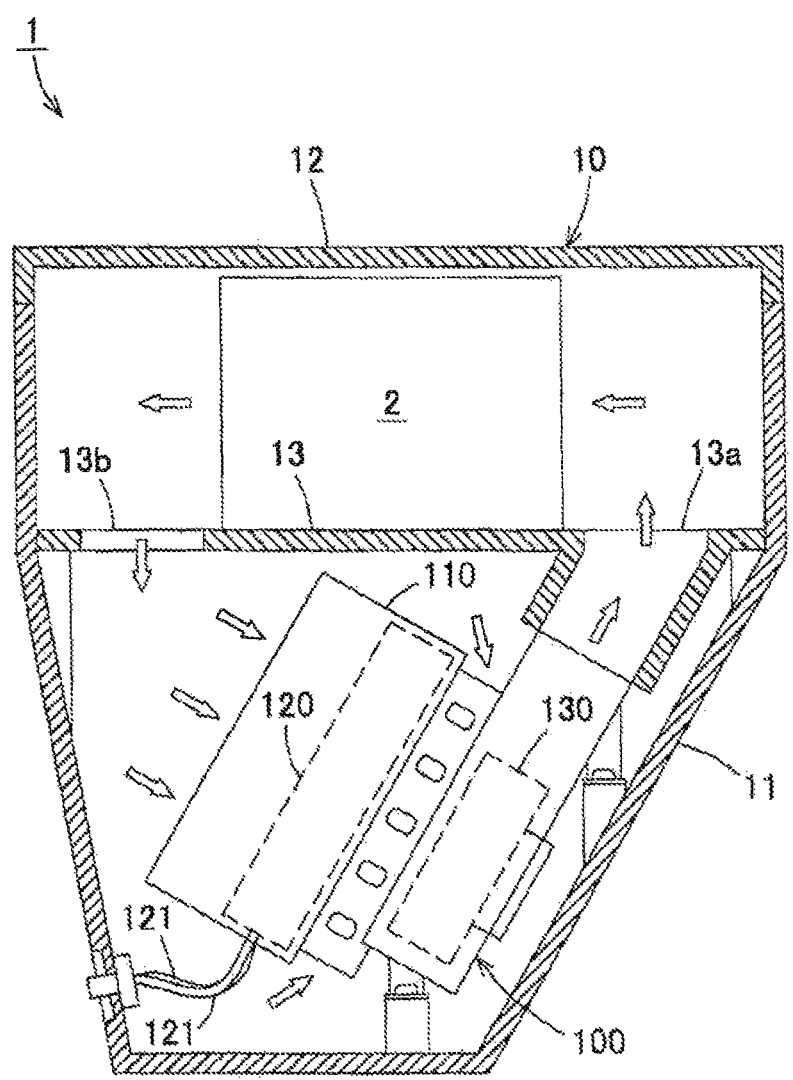
FIG. 1 illustrates a battery module according to a first embodiment of the present invention. The white arrows in the drawing indicate directions of air flows in a module case.
Figure 8:
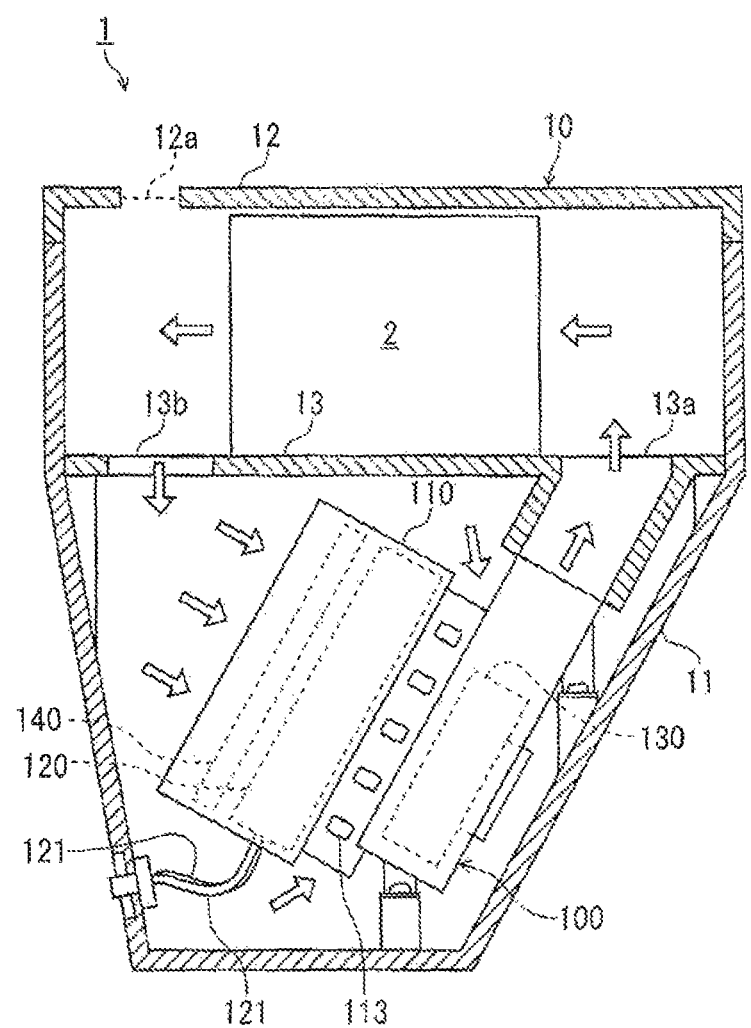
FIG. 8 illustrates the battery module according to the fourth embodiment of the invention.

In the battery temperature adjustment unit 100 of the battery module 1 shown in FIG. 8, the air inlet 113s are disposed in a section between the heat exchanger 120 and the blower 130 as in the battery temperature adjustment unit 100 in FIG. 1. Accordingly, as described above, when air is sucked through the air inlets 113, air blown out through the air outlet 112 includes air that has not passed through the heat exchanger 120 and the cooling of air by the heat exchanger 120 and the cooling of the battery 2 by air blown out through the air outlet 112 can be ensured in good balance, thereby improving the cooling efficiency of the battery 2 reliably.

Figure 9:
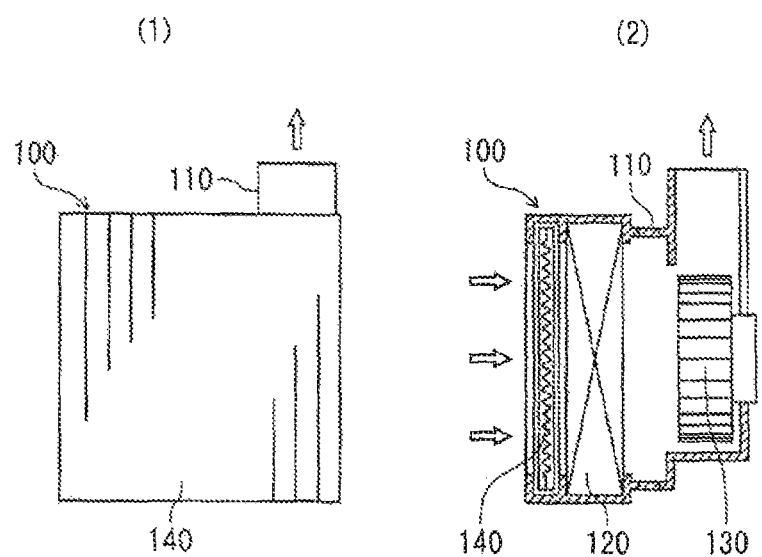
FIG. 9 illustrates a battery temperature adjustment unit according to the fourth embodiment of the invention, and (1) is a front view and (2) illustrates the cross section of a side.

FIG. 9 shows the battery temperature adjustment unit 100 according to the embodiment used in FIG. 7. In the unit case 110, the electric heater 140 and the heat exchanger 120 are disposed upstream of the blower 130 in sequence so as to face the blower 130.

Figure 10:
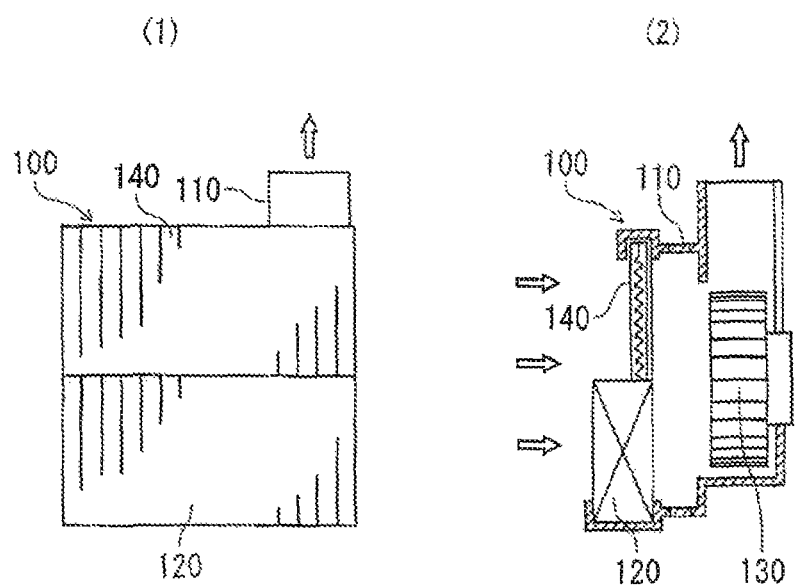
FIG. 10 is another example illustrating the battery temperature adjustment unit according to the fourth embodiment, and (1) is a front view and (2) illustrates the cross section of a side.

On the other hand, FIG. 10 shows another example of the fourth embodiment of the invention and, in this example, the electric heater 140 and the heat exchanger 120 are disposed orthogonally to the direction of air blowing. The electric heater 140 and the heat exchanger 120 are provided in a so-called cascade arrangement in FIG. 9 and they are provided in a parallel arrangement in FIG. 10.

When the battery temperature adjustment unit 100 shown in FIG. 10 is mounted in a vehicle, the electric heater (heater) 140 is disposed above the heat exchanger 120 for cooling. Accordingly, even when water droplets are generated in the heat exchanger 120 in a lower position, the droplets do not adhere to the electric heater 140 in an upper position.

Figure 11:
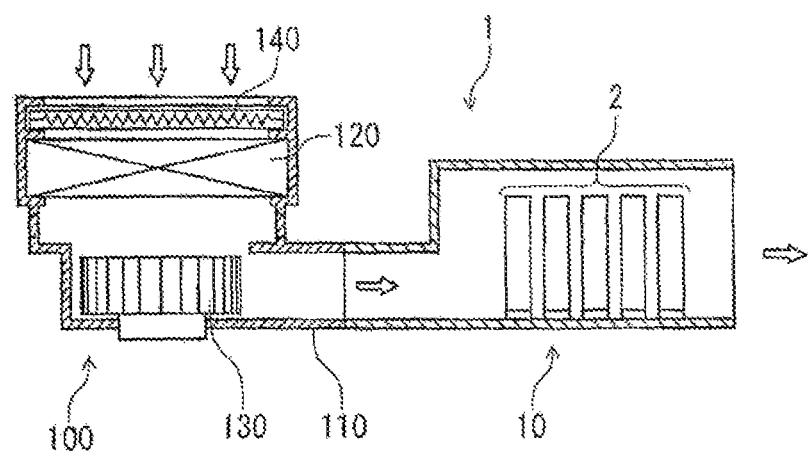
FIG. 11 illustrates another battery module according to the fourth embodiment of the invention.

FIG. 11 shows a fifth embodiment of the invention. In the embodiment, the module case 10 forms an open circuit. That is, the battery temperature adjustment unit 100 on the upstream side sucks outside air, and the battery temperature adjustment unit 100 blows the air subjected to temperature adjustment to the module case 10 on the downstream side and exhausts the air externally from the downstream side of the module case 10. In the invention, such an open circuit may also be used in addition to the above closed circuit.

INDUSTRIAL APPLICABILITY

The invention can be advantageously used as a battery temperature adjustment unit mounted in an electric vehicle or hybrid car, a battery module including the battery temperature adjustment unit, and a vehicle including the battery temperature adjustment unit.

REFERENCE SIGNS LIST

1: battery module
2: battery
10: module case
11: first module case member
12: second module case member
12a: film body
13: third module case member
13a: first communication hole
13b: second communication hole
100: battery temperature adjustment unit
110: unit case
111: air inlet
112: air outlet
113: second inlet
114: bypass passage
115: bypass passage
120: heat exchanger
121: pipe
130: blower
140: electric heater

The invention claimed is:

1. A battery temperature adjustment unit provided in a module case accommodating a battery, the battery temperature adjustment unit comprising:
 a unit case having an air inlet and an air outlet;
 a heat exchanger disposed in the unit case; and
 a blower disposed in the unit case,
 wherein air in the module case is sucked through the air inlet by the blower while being blown out through the air outlet and circulates through the module case and;
 the air blown out through the air outlet includes air that has passed through the heat exchanger and air that has not passed through the heat exchanger;
 a heater disposed between the air inlet and the blower, wherein the heater is disposed closer to the air inlet than the heat exchanger for cooling, and wherein the heat exchanger for cooling and an inlet of the sirocco fan face one another, wherein the heater is also disposed between the air inlet and the heat exchanger for cooling such that the air inlet, the heater, the heat exchanger for cooling, the blower, and the air outlet are disposed one after another in a direction of air circulation.

2. The battery temperature adjustment unit according to claim 1,
 wherein the heat exchanger is disposed closer to the air inlet than the blower and
 the unit case has a second inlet in a section between the heat exchanger and the blower.

3. The battery temperature adjustment unit according to claim 1,
 wherein the unit case has a bypass passage through which part of the air sucked through the air inlet passes by bypassing the heat exchanger.

4. The battery temperature adjustment unit according to claim 1,
 wherein the unit case has an electric heater.

5. An in-vehicle battery module comprising:
 the battery temperature adjustment unit according to claim 1.

6. A vehicle comprising:
 the battery temperature adjustment unit according to claim 1.

7. A battery temperature adjustment unit provided in a module case accommodating a battery, the battery temperature adjustment unit comprising:
 a unit case having an air inlet and an air outlet;
 a heat exchanger disposed in the unit case;
 a blower disposed in the unit case, wherein air in the module case is sucked through the air inlet by the blower while being blown out through the air outlet and circulates through the module case and the heat exchanger is a heat exchanger for cooling and disposed between the air inlet and the blower, and wherein the blower comprises a sirocco fan and a motor; and a heater disposed between the air inlet and the blower, wherein the heater is disposed closer to the air inlet than the heat exchanger for cooling, and wherein the heat exchanger for cooling and an inlet of the sirocco fan face one another, wherein the heater is also disposed between the air inlet and the heat exchanger for cooling such that the air inlet, the heater, the heat exchanger for cooling, the blower, and the air outlet are disposed one after another in a direction of air circulation.

8. The battery temperature adjustment unit according to claim 7, wherein the heater is an electrically heat-generating heater.

9. An in-vehicle battery module comprising:
the battery temperature adjustment unit according to claim 7.

10. A vehicle comprising:
the battery temperature adjustment unit according to claim 7.

\* \* \* \* \*